United States Patent
Blass et al.

(10) Patent No.: US 11,271,743 B2
(45) Date of Patent: Mar. 8, 2022

(54) PLAINTEXT EQUIVALENCE PROOF TECHNIQUES IN COMMUNICATION SYSTEMS

(71) Applicant: AIRBUS DEFENCE AND SPACE GMBH, Taufkirchen (DE)

(72) Inventors: Erik-Oliver Blass, Munich (DE); Guevara Noubir, Brookline, MA (US)

(73) Assignee: Airbus Defence and Space GmbH, Taufkirchen (DE)

( * ) Notice: Subject to any disclaimer, the term of this patent is extended or adjusted under 35 U.S.C. 154(b) by 433 days.

(21) Appl. No.: 16/148,679

(22) Filed: Oct. 1, 2018

(65) Prior Publication Data

US 2019/0109712 A1 Apr. 11, 2019

Related U.S. Application Data

(60) Provisional application No. 62/566,942, filed on Oct. 2, 2017.

(51) Int. Cl.
*H04L 9/08* (2006.01)
*H04L 9/32* (2006.01)
*H04L 9/30* (2006.01)

(52) U.S. Cl.
CPC .......... *H04L 9/3221* (2013.01); *H04L 9/0825* (2013.01); *H04L 9/0891* (2013.01);
(Continued)

(58) Field of Classification Search
CPC ... H04L 9/3221; H04L 9/0825; H04L 9/0891; H04L 9/3013; H04L 9/3218; H04L 9/3242; H04L 2209/42
See application file for complete search history.

(56) References Cited

U.S. PATENT DOCUMENTS 6,697,488 B1 * 2/2004 Cramer ................. H04L 9/3013
380/28
6,813,354 B1 11/2004 Jakobsson et al.
(Continued)

OTHER PUBLICATIONS

European Office Action for Application No. 18178835.7 dated May 28, 2021.
(Continued)

*Primary Examiner* — Lynn D Feild
*Assistant Examiner* — Vladimir I Gavrilenko
(74) *Attorney, Agent, or Firm* — Jenkins, Wilson, Taylor & Hunt, P.A.

(57) ABSTRACT

Methods aiding in proving shuffles of re-encryptions of ciphertexts and a mixnet employing such methods. A method for compacting ciphertexts includes encrypting a plaintext using an asymmetric key encryption scheme for a ciphertext, dividing the ciphertext into partial ciphertexts, encrypting each of the partial ciphertexts using the asymmetric key encryption scheme to obtain re-encrypted partial ciphertexts, creating hash exponents from a digest of a cryptographic hash function taking the partial ciphertexts, the re-encrypted partial ciphertexts and arbitrary salt values as argument of the cryptographic hash function, calculating a compacted ciphertext by multiplying all of the partial ciphertexts exponentiated by a respective one of the plurality of hash exponents, and calculating a compacted re-encrypted ciphertext by multiplying all of the re-encrypted partial ciphertexts exponentiated by a respective one of the hash exponents.

18 Claims, 4 Drawing Sheets

(52) U.S. Cl.
CPC .......... H04L 9/3013 (2013.01); H04L 9/3218 (2013.01); H04L 9/3242 (2013.01); *H04L 2209/42* (2013.01)

(56) References Cited

U.S. PATENT DOCUMENTS

| | | | | |
|---|---|---|---|---|
| 2006/0262933 A1* | 11/2006 | Furukawa | ............. | H04L 9/3066 380/281 |
| 2012/0144459 A1* | 6/2012 | Nguyen | ............... | H04L 9/0891 726/5 |
| 2014/0195804 A1* | 7/2014 | Hursti | ....................... | H04L 9/14 713/168 |
| 2015/0082399 A1* | 3/2015 | Wu | ....................... | H04L 9/0897 726/6 |
| 2017/0033925 A1* | 2/2017 | DeNeut | ................. | H04L 9/0819 |

OTHER PUBLICATIONS

European Office Action for Application No. 18178835.7 dated Aug. 5, 2020.
Chaum, D.: "Untraceable Electronic Mail, Return Addresses, and Digital Pseudonyms", Communications of the ACM, vol. 24, No. 2, pp. 84-88, Feb. 1981.
Cramer, R., Damgård, I., Schoenmakers, B.: "Proofs of Partial Knowledge and Simplified Design of Witness Hiding Protocols", In Advances in Cryptology—CRYPTO '94, vol. 839 of Lecture Notes in Computer Science, Springer-Verlag, pp. 174-187, 1994.
Groth, J., Lu, S.: "Verifiable Shuffle of Large Size Ciphertexts", In: Okamoto T., Wang X. (Eds.) Public Key Cryptography, PKC 2007, Lecture Notes in Computer Science, vol. 4450, Springer, Berlin, Heidelberg, 16 pages.
Terelius, B., Wikström, D.: "Proofs of Restricted Shuffles", D.J. Bernstein and T. Lange (Eds.): AFRICACRYPT 2010, LNCS 6055, Springer-Verlag Berlin Heidelberg 2010, pp. 100-113, 2010.
European Office Action for Application No. 18178835.7 dated Feb. 21, 2020.
"Chapter 9: Hash Functions and Data Integrity," Handbook of Applied Cryptography, A. Menezes, P. van Oorschot, S. Vanstone, eds., CRC Press Series on Discrete Mathematices and Its Applications, CRC Press Boca Raton FL, US, pp. 321-383, Oct. 1, 1996.
Jakobsson et al., "Millimix: Mixing in Small Batches," XP-002196854, DIMACS Technical Report 99-33, 11 pages, Jun. 1999.
Extended European Search Report for Application No. 18178835.7 dated Jan. 8, 2019.

* cited by examiner

```
// Let H be a random oracle, all operations are performed in a group $\mathbb{G}, |\mathbb{G}| \in \Omega(2^\lambda)$
   where the DDH assumption holds with security parameter $\lambda$. Let ","
   denote an unambiguous pairing of inputs, and let $c[1]$ denote the first part
   of an Elgamal ciphertext tuple $c$ and $c[2]$ the second part.
Input: Two large Elgamal ciphertext $c = c_1, ..., c_n$ and $c' = c'_1, ..., c'_n$, auxiliary bit
       string aux
Output: Two ciphertexts $C$ and $C'$
1 for $i = 1$ to $n$ do
2    $a_i = H(c_1, ..., c_n, c'_1, ..., c'_n, aux, i)$;
3 end
4 output $C = (\prod_{i=1}^n c_i[1]^{a_i}, \prod_{i=1}^n c_i[2]^{a_i}), C' = (\prod_{i=1}^n c'_i[1]^{a_i}, \prod_{i=1}^n c'_i[2]^{a_i})$;
```

Fig. 1

```
// Let H be a random oracle. All operations are performed in a group $\mathbb{G}, |\mathbb{G}| \in \Omega(2^\lambda)$
   where the DDH assumption holds with security parameter $\lambda$. Let ","
   denote an unambiguous pairing of inputs, and let $c[1]$ denote the first part
   of an Elgamal ciphertext tuple $c$ and $c[2]$ the second part.
Input: Large Elgamal ciphertext $c = c_1, ..., c_n$, generator $g$, public key $y = g^x$
Output: 1 if $\forall i : Dec_x(c_i) = Dec_x(c'_i)$, and 0 otherwise, for an implicitly generated
        sequence of ciphertexts $c' = c'_1, ..., c'_n$
// First, prover P computes a second large Elgamal ciphertext $c'$, a re-
   encryption of $c$.
for $i = 1$ to $n$ do
    $r'_i \xleftarrow{\$} \{0,1\}^\lambda$;
    $c'_i = (g^{r'_i} \cdot c_i[1], y^{r'_i} \cdot c_i[2])$;
end
// Prover P will now prove in zero-knowledge to verifier V that $c' = c'_1, ..., c'_n$
   are re-encryptions of $c = c_1, ..., c_n$.
```

| P | V |
|---|---|
| $s \xleftarrow{\$} \{0,1\}^\lambda$; $t_1 = g^s$; $t_2 = y^s$ | |
| $aux = H(c_1, ..., c_n, c'_1, ..., c'_n, g, y, t_1, t_2)$ | |
| for $i = 1$ to $n$ do | |
| $\quad a_i = H(c_1, ..., c_n, c'_1, ..., c'_n, aux, i)$ | |
| end | |
| $R = \sum_{i=1}^n r'_i \cdot a_i$; | |
| $\rho = s + aux \cdot R$; | |
| $\xrightarrow{t_1, t_2, \rho}$ | |
| | $aux = H(c_1, ..., c_n, c'_1, ..., c'_n, g, y, t_1, t_2)$ |
| | for $i = 1$ to $n$ do |
| | $\quad a_i = H(c_1, ..., c_n, c'_1, ..., c'_n, aux, i)$ |
| | end |
| | $C = (\prod_{i=1}^n c_i[1]^{a_i}, \prod_{i=1}^n c_i[2]^{a_i})$; |
| | $C' = (\prod_{i=1}^n c'_i[1]^{a_i}, \tau \prod_{i=1}^n c'_i[2]^{a_i})$; |
| | $\gamma = \frac{c'[1]}{c[1]}$; $\delta = \frac{c'[2]}{c[2]}$ |
| | if $c[1], c[2], c'[1], c'[2], t_1, t_2, \gamma, \delta \in \mathbb{G} \land$ |
| | $g^\rho = t_1 \cdot \gamma^{aux} \land y^\rho = t_2 \cdot \delta^{aux}$ then |
| | output 1 else output 0; |

Fig. 2

// Let $H$ be a random oracle, all operations are performed in a group $\mathbb{G}, |\mathbb{G}| \in \Omega$
($2^\lambda$) where the DDH assumption holds with security parameter $\lambda$. Let ","
denote an unambiguous pairing of inputs, and let $c[1]$ denote the first part
of an Elgamal ciphertext tuple $c$ and $c[2]$ the second part.

Input: Large Elgamal ciphertexts $c = c_1, ..., c_n$, generator $g$, public keys $y_1 = g^{x1}$,
$y_2 = g^{x2}$ Output: 1 if $\forall i : \text{Dec}_{x1}(c_i) = \text{Dec}_{x1}(c'_i) \vee ... \vee \text{Dec}_{x1}(c_i) = \text{Dec}_{x1}(c'_{m,i})$, and 0 otherwise,
for implicitly generated ciphertext sequences $c'_i = c'_{i,1}, ..., c'_{i,n}, i \in \{1, ..., m\}$
with one ciphertext sequence being re-encryptions of ciphertext
sequence $c$.

// Prover $P$ will now prove in zero-knowledge to verifier $V$ that one sequence
$c'_i$ is a re-encryption of sequence $c$. W.l.o.g. let $c'_i$ be the re-encryption
using $r'_i$.

---

$P$                $V$ $s_1 \xleftarrow{\$} \{0,1\}^\lambda$; $t_{1,1} = g^{s_1}$; $t_{1,2} = y^{s_1}$
for $i \neq 1$ do
 $\rho_i \xleftarrow{\$} \mathbb{G}$;
 $aux_i \xleftarrow{\$} \{0,1\}^\lambda$;
 $t_{i,1} = g^{\rho_i} \cdot \left(\frac{c'_i[1]}{c_i[1]}\right)^{aux_i}$; $t_{i,2} = g^{\rho_i} \cdot \left(\frac{c'_i[2]}{c_i[2]}\right)^{aux_i}$;
end
$aux_1 =$
$H(c, c'_1, ..., c'_m, g, y, (t_{1,1}, t_{1,2}), ..., (t_{m,1}, t_{m,2})) \oplus_{i \neq 1} aux_i$;

$aux = \oplus_{i=1}^{m} aux_i$;
for $i = 1$ to $n$ do
 $a_i = H(c, c'_1, ..., c'_m, aux, i)$;
end
$R = \sum_{i=1}^{n} r'_i \cdot a_i$;
$\rho_1 = s_1 + R \cdot aux_1$;

$(t_{1,1}, t_{1,2}), ..., (t_{m,1}, t_{m,2}), \rho_1, ..., \rho_m, aux_1, ..., aux_m$
      $\longrightarrow$ $aux =$
            $H(c, c'_1, ..., c'_m, g, y, (t_{1,1}, t_{1,2}), ..., (t_{m,1}, t_{m,2}))$;
            if $\oplus_{i=1}^{m} aux_i \neq aux$ then
             output 0;
            else
             Perform m verifications using
             Mechanism 2 with tuples
             $(c, c'_1, t_{1,1}, t_{1,2}, \rho_1), ..., (c, c'_m, t_{m,1}, t_{m,2}, \rho_m)$;

If all verifications output 1,
             also output 1.
             Otherwise output 0;
            end

Fig. 3

PLAINTEXT EQUIVALENCE PROOF TECHNIQUES IN COMMUNICATION SYSTEMS

CROSS-REFERENCE TO RELATED APPLICATION

This application claims priority to U.S. Provisional Application Ser. No. 62/566,942 filed Oct. 2, 2017, the entire disclosure of which is incorporated by reference herein.

TECHNICAL FIELD

The disclosure herein relates to plaintext equivalence proof (PEP) techniques used in proofs of shuffle. The PEP techniques of the disclosure herein may be used in communication systems for encrypted communication. Particularly, the PEP techniques and the corresponding communication systems may be employed in implementing mixnets.

BACKGROUND

Mixnets are ubiquitously used in scenarios where linkability of senders and receivers of messages in a communication network should be protected against eavesdropping adversaries. General information about mixnets may for example be found in Chaum, D.: "Untraceable electronic mail, return addresses, and digital pseudonyms", Commun. ACM, 24(2):84-88, 1981. Verifiable mixnets are for example often used in electronic voting protocols where they anonymize the voting channel for votes cast by voters into an overall tally. Mixnets running re-encryption protocols shuffle a sequence of encrypted input messages into a re-encrypted sequence of randomly shuffled output messages.

Shuffling is usually performed through a series of mixing nodes. To further protect the mixnet against malicious mixes participating in the shuffle, each mix needs to prove that the encrypted input messages have been correctly shuffled, i.e. that the output messages do not contain any wrongly encrypted input messages or maliciously exchanged input messages. Moreover, the sequence of output messages needs to verifiably be bijective with respect to the input messages.

To demonstrate the correctness of a mixnet shuffle, mixers individually perform proofs of shuffle in zero-knowledge, i.e. certifications that the shuffling process has been carried out correctly without revealing the actual permutation of the mixer to a verifier. As long as at least one trustworthy mixer is involved in the whole shuffling process, the end-to-end link between the input and output of a mixnet may be kept secret.

On a mathematical or cryptographical level, proofs of shuffle in zero knowledge require disjunctive plaintext equivalence proofs (DPEPs) which are based on standard plaintext equivalence proofs (PEPs). An exemplary technique for a DPEP may be found in Cramer, R., Damgård, I., Schoenmakers, B.: "Proofs of partial knowledge and simplified design of witness hiding protocol", In: Advances in Cryptology—CRYPTO'94, 14$^{th}$ Ann. Int. Crypt. Conf., Santa Barbara, Calif., USA, Aug. 21-25, 1994, Proc., pp. 174-187, 1994. Current techniques for DPEPs are limited in their efficiency due to the finite group size of the underlying plaintext encryption algorithms. For example, with standard security parameters, Elgamal encryption algorithms can encrypt plaintexts having a maximum length of 2048 bit. To encrypt longer plaintexts, those plaintexts are usually split into a sequence of shorter plaintexts meeting the maximum length for the Elgamal encryption algorithm. The sequence of shorter plaintexts is then Elgamal encrpyted one-by-one into a sequence of shorter ciphertexts. To prove a shuffle of re-encryptions of this sequence of shorter plaintexts in zero-knowledge, prover and verifier need to perform zero-knowledge arguments in at least as many rounds as the sequence has elements, leading to a total communication complexity in the order of needed rounds.

Terelius, B., Wikström, D.: "Proofs of restricted shuffles", Africacrypt 2010, volume 6055 of Lecture Notes in Computer Science, pages 100-113, 2010 disclose a general technique for constructing proofs of shuffles which restrict the permutation to a group that is characterized by a public polynomial. Groth J., Lu S.: "Verifiable Shuffle of Large Size Ciphertexts", In: Okamoto T., Wang X. (eds.) Public Key Cryptography, PKC 2007, Lecture Notes in Computer Science, vol 4450, Springer, Berlin, Heidelberg disclose improvements of the computational complexity and communication complexity when shuffling large ciphertexts.

It would be desirable to find solutions for increasing the efficiency of plaintext equivalence proofs in zero knowledge for longer sequences of plaintexts.

SUMMARY

According to the disclosure of disclosure herein methods aiding in proving shuffles of re-encryptions of ciphertexts and a mixnet employing such methods may be implemented. The methods include a technique that allows to prove such a shuffle of re-encryptions with a proof communication complexity in $O(1)$, i.e. independent from the size of the underlying plaintexts and the maximum encryption lengths used in public-key cryptosystems for encrypting the plaintexts to ciphertexts, such as for example ElGamal or Paillier encryption algorithms.

Specifically, according to a first aspect of the disclosure herein, a method for compacting ciphertexts involves encrypting a plaintext using an asymmetric key encryption scheme to obtain a ciphertext. The ciphertext is then divided into a plurality of partial ciphertexts and each of the plurality of partial ciphertexts is encrypted using the asymmetric key encryption scheme to obtain a plurality of re-encrypted partial ciphertexts. The method further includes creating a plurality of hash exponents from a digest of a cryptographic hash function taking the plurality of partial ciphertexts, the plurality of re-encrypted partial ciphertexts and a plurality of arbitrary salt values as argument of the cryptographic hash function. A compacted ciphertext is calculated by multiplying all of the plurality of partial ciphertexts exponentiated by a respective one of the plurality of hash exponents. Finally, a compacted re-encrypted ciphertext is calculated by multiplying all of the plurality of re-encrypted partial ciphertexts exponentiated by a respective one of the plurality of hash exponents.

According to a second aspect of the disclosure herein, a method for performing a zero-knowledge proof of plaintext equivalence involves, on a prover side: dividing a ciphertext into a plurality of partial ciphertexts, the ciphertext being an encrypted plaintext using an asymmetric key encryption scheme and encrypting each of the plurality of partial ciphertexts using the asymmetric key encryption scheme with a plurality of re-encryption keys to obtain a plurality of re-encrypted partial ciphertexts. The prover further creates a plurality of hash exponents from a digest of a cryptographic hash function taking the plurality of partial ciphertexts, the plurality of re-encrypted partial ciphertexts and a plurality of salt values as argument of the cryptographic hash function, the plurality of salt values being based on a commitment chosen by the prover. Then, the prover transmits the plurality of re-encrypted partial ciphertexts and the sum of the commitment and the product of the plurality of salt values, the plurality of hash exponents and the plurality of re-encryption keys to the verifier. On the verifier side, the method involves re-calculating the plurality of hash exponents from the digest of the cryptographic hash function taking the plurality of partial ciphertexts, the plurality of re-encrypted partial ciphertexts and the plurality of salt values as argument of the cryptographic hash function. The verifier then calculates a compacted ciphertext by multiplying all of the plurality of partial ciphertexts exponentiated by a respective one of the plurality of re-calculated hash exponents, and a compacted re-encrypted ciphertext by multiplying all of the plurality of re-encrypted partial ciphertexts exponentiated by a respective one of the plurality of re-calculated hash exponents. The verifier finally verifies that the compacted re-encrypted ciphertext is a re-encryption of the compacted ciphertext, thereby verifying that each of the plurality of re-encrypted partial ciphertexts is an encryption of the plurality of partial ciphertexts.

According to a third aspect of the disclosure herein, a method for performing a disjunctive proof of plaintext equivalence involves, on a prover side: dividing a ciphertext into a plurality of partial ciphertexts, the ciphertext being an encrypted plaintext using an asymmetric key encryption scheme and encrypting each of the plurality of partial ciphertexts using the asymmetric key encryption scheme with a first plurality of re-encryption keys to obtain a plurality of re-encrypted partial ciphertexts. The prover further creates a first plurality of hash exponents from a digest of a cryptographic hash function taking a selected first one of the plurality of partial ciphertexts, the plurality of re-encrypted partial ciphertexts and a first plurality of salt values as argument of the cryptographic hash function, the first plurality of salt values being based on a first commitment chosen by the prover. Then, the prover transmits the plurality of re-encrypted partial ciphertexts and the sum of the first commitment and the product of the first plurality of salt values, the first plurality of hash exponents and the first plurality of re-encryption keys to a verifier. On the verifier side, the method involves: re-calculating the first plurality of hash exponents from the digest of the cryptographic hash function taking the plurality of partial ciphertexts, the plurality of re-encrypted partial ciphertexts and the first plurality of salt values as argument of the cryptographic hash function. The verifier then calculates a compacted ciphertext by multiplying all of the plurality of partial ciphertexts exponentiated by a respective one of the first plurality of re-calculated hash exponents. The verifier further calculates a compacted re-encrypted ciphertext by multiplying all of the plurality of re-encrypted partial ciphertexts exponentiated by a respective one of the first plurality of re-calculated hash exponents. The verifier finally verifies that the compacted re-encrypted ciphertext is a re-encryption of the compacted ciphertext, thereby verifying that at least one of the plurality of re-encrypted partial ciphertexts is an encryption of an arbitrary one of the plurality of partial ciphertexts. The steps taken by the prover and the verifier are each repeated for a selected second one of the plurality of partial ciphertexts using a second plurality of re-encryption keys, a second plurality of salt values being based on a second commitment chosen by the prover and a second plurality of hash exponents as input parameters for the second stage of the proof of plaintext equivalence.

According to a fourth aspect of the disclosure herein, a method for verifying a shuffle of re-encryptions of a plurality of ciphertexts in zero-knowledge involves performing the first and second stages for the proof of plaintext equivalence of the method according to the third aspect of the disclosure herein for the partial ciphertexts of a first ciphertext of the plurality of ciphertexts. Then, the same first and second stages for the proof of plaintext equivalence of the method according to the third aspect of the disclosure herein are again performed as third and fourth stages for the partial ciphertexts of a second ciphertext of the plurality of ciphertexts. In order to additionally show that the independently verified shuffles are really a permutation of the plaintexts underlying the first and second ciphertexts, the method finally involves performing a proof of plaintext equivalence on the product of the compacted ciphertexts of the first to fourth stages and the product of the compacted re-encrypted ciphertexts of the of the first to fourth stages. This demonstrates that the ciphertexts in both sequences of ciphertexts remains the same, irrespective of the chosen first and second ones of the plurality of ciphertexts.

According to a fifth aspect of the disclosure herein, a mixnet comprises a plurality of mixes, each mix configured to re-encrypt a plurality of ciphertexts input to the mix and to shuffle the re-encryptions of the input plurality of ciphertexts. The mixnet further comprises a verification device coupled to each of the mixes. Each of the mixes may act as a prover separately, with the verification device acting as verifier on the other side. Together, each of the mixes and the verification device are configured to perform any of the methods according to the second, third and/or fourth aspect of the disclosure herein.

One fundamental idea of the disclosure herein is that long ciphertexts consisting of a sequence of smaller partial ciphertexts may be compacted into a single regular ciphertext by multiplying all of the smaller partial ciphertexts, each of the partial ciphertexts being weighted by randomly selected parameters as exponents. If the randomly selected parameters are chosen under the governance of a random oracle function and the partial ciphertexts as input argument to the random oracle function, then compacted ciphertext will serve as a succinct fingerprint for the long ciphertext.

Amongst others, there are several specific advantages associated with such methods and mixnets employing one or more of the methods. The most prominent advantage is that any re-encryptions of the long ciphertexts and the sequence of smaller partial ciphertexts may be compacted in the same manner as the original long ciphertext and the sequence of smaller partial ciphertexts. If it can be verified that the compacted ciphertext and the compacted re-encrypted ciphertext are in fact re-encryptions of one another, it can be unambiguously proven that the re-encrypted long ciphertext is indeed a re-encryption of the original long ciphertext.

Malicious provers cannot possibly cheat by modifying any of the sequence of smaller re-encrypted partial ciphertexts since doing so would render at least one of the randomly selected exponentiation parameters to change. Thus, a prover would need to know randomly selected exponentiation parameters before modifying the re-encrypted partial ciphertexts—an impossible feat if the randomly selected exponentiation parameters depend on the re-encrypted partial ciphertexts (impossible within a margin negligibly beyond the security parameter of the chosen re-encrpytion mechanism).

The methods are particularly useful for ElGamal encryption systems as asymmetric key encryption scheme. ElGamal encryption systems have security parameters that allow only for a limited plaintext length, for example 2048 bit. Thus, longer plaintexts need to be chopped into partial plaintexts of limited length, each to be encrypted separately. Therefore, proofs of shuffle for ElGamal encrypted partial plaintexts benefit greatly from more efficient proving techniques such as the ones set forth in the aspects of this disclosure herein.

The suggested techniques are secure in the random oracle regime. Thus, it is advantageous if the used cryptographic hash function is a one-way function, particularly a hash function for which the output values are chosen uniformly at random, i.e. a random oracle function. Random oracle functions are designed such that the output values have a degree of randomness that any probabilistic Turing machine would only be able to draw any reliable conclusion from the output to the input with at best negligible probability in polynomial time.

Specific embodiments of the disclosure herein are set forth in the disclosure herein.

These and other aspects of the disclosure herein will be apparent from and elucidated with reference to the embodiments described hereinafter.

BRIEF DESCRIPTION OF THE DRAWINGS

Further details, aspects and embodiments of the disclosure herein will be described, by way of example only, with reference to the accompanying, example drawings. Elements in the drawings are illustrated for simplicity and clarity and have not necessarily been drawn to scale.

FIG. 1 schematically illustrates a technique for compaction of a plaintext equivalence proof in pseudocode style according to an embodiment of the disclosure herein.

FIG. 2 schematically illustrates a technique for performing a zero-knowledge proof of plaintext equivalence using the compaction technique of FIG. 1 in pseudocode style according to another embodiment of the disclosure herein.

FIG. 3 schematically illustrates a technique for performing a disjunctive proof of plaintext equivalence using the compaction technique of FIG. 1 in pseudocode style according to a further embodiment of the disclosure herein.

In all figures of the drawings elements, features and components which are the same or at least have the same functionality have been provided with the same reference symbols, unless explicitly stated otherwise.

DETAILED DESCRIPTION

Mixnets within the meaning of the disclosure herein include communication using routing protocols which create hard-to-trace communications by using a chain of proxy servers (so-called "mixes"). The mixes receive messages from multiple senders, shuffle them, and send them back out in random order to the next destination, for example a downstream connected mix. Mixnets are able to break the link between the source of the message and the ultimate destination, thus rendering it more difficult—if not technically impossible—for eavesdroppers to trace end-to-end communications. In some mixnets, mixes only know the immediately preceding mix for a set of particular messages and the immediate destination mix to send the shuffled messages to. For such mixnets with limited knowledge of the mixes, the network is more resistant to potentially malicious mixes.

Ciphertexts are the result of encryption performed on plaintext using an encryption algorithm, the so-called "cipher", on an individual level of the information code items resembling the plaintext. For example, ciphers operate on individual letters of a plaintext or—in digital encryption—on individual bits of a digital plaintext message. Ciphertexts include encrypted or encoded information due to its representation being plaintext, but its contents being unintelligible to either human readers or computers without the proper decryption algorithm. Decryption as the inverse operation of encryption involves turning ciphertext into intelligible plaintext.

Cryptographic hash functions within the meaning of the disclosure herein includes mathematical algorithms mapping input queries of arbitrary size (sometimes called "messages") to bit strings of fixed and pre-determined size (called "digests"). Cryptographic hash functions may in particular be designed to be deterministic, computationally efficient, pre-image resistant, second pre-image resistant and computationally inefficient to inversion. If a cryptographic hash function may be the to be truly random, i.e. not only computationally inefficient to inversion, but rather a true one-way function which renders it infeasible to an adversary to determine any property of the argument from the digest, such cryptographic hash function has the property of a random oracle. In such cases, any other way than brute-forcing a search of matching digests with all possible inputs is not solvable in asymptotic polynomial time, thus a random oracle may be the to be provably secure.

Figure 4:
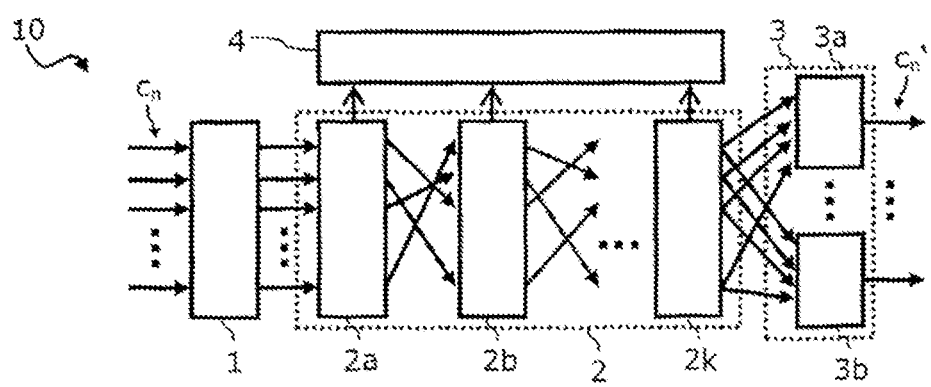
FIG. 4 schematically illustrates a mixnet according to yet another embodiment of the disclosure herein.

FIG. 4 schematically illustrates a mixnet 10. The mixnet 10 may for example use an ElGamal cryptosystem as underlying encryption mechanism since the homomorphic property of the ElGamal cryptosystem allows for lossless re-encryption under the same regime. The mixnet 10 comprise an initial encryption stage 1, a number of mixnet servers 2a, 2b, 2k connected in sequence and an output stage 3 coupled to the last of the sequence of mixnet servers 2a, 2b, 2k. The output stage 3 may comprise a number decryption stages 3a, 3b.

The essential core of the re-encryption mixnet 10 consists of or comprises a number of mixnet servers 2a, 2b, . . . , 2k, also termed "mixes". The mixes sequentially process the messages $c_n$ received at the encryption stage 1 from a plurality of inputs. After the initial encryption of the messages $c_n$, the mixes re-encrypt the list of messages $c_n$ and randomize their order of output. After passing through all mixes 2a, 2b, . . . , 2k, the list of shuffled ciphertexts is output to the decryption stages 3a, 3b where the resulting list includes all decrypted messages $c_n'$ in random order. After decryption of the ciphertexts, the initial list position of each message $c_n$ is untraceable to the respective sender.

The mixes 2a, 2b, . . . , 2k run a distributed key generation protocol so that each mix retains a verifiably secret private key and a public key to be distributed freely among all interested parties. Any mix encrypts messages and outputs the resulting ciphertexts in a random order. In order to prevent cheating mixes from participating in the mixnet and maliciously altering the content of the ciphertexts they output, each mix must be able to prove that it knows the plaintext of the re-encrypted ciphertext. Quite obviously, any scheme for proving the plaintext equivalence needs to be correct, sound and performable in perfect zero knowledge (or at least computationally hiding zero knowledge), otherwise the privacy of the senders of the encrypted and shuffled messages cannot be guaranteed.

To that end, the mixes $2a, 2b, \ldots, 2k$ are all coupled with a central verification device 4 that runs corresponding protocols in exchange with each of the mixes $2a, 2b, \ldots, 2k$ to ensure proper shuffling. Depending on the requirements of the proof of shuffle and the number of messages to be re-encrypted and shuffled, the number of rounds that are necessary to perform a zero-knowledge argument between a mix as proving party and the verification device 4 as verifying party may be very large. For long plaintexts that have a length longer than the group size of the underlying homomorphic encryption system, the plaintexts need to be chopped into smaller plaintexts. Each of the smaller plaintexts then needs to be subject to re-encryptions separately so that longer plaintexts as input will lead to a vastly increase communication complexity for the proofs of plaintext equivalence which is in the order of the number of smaller plaintexts. Thus, common plaintext equivalence techniques are no longer efficiently computable by the mixes and the verification device.

FIG. 1 schematically illustrates a technique for compaction of a plaintext equivalence proof in pseudocode style. The main idea of this technique lies in the calculation of a compacted ciphertext that is the product of all smaller ciphertexts in the sequence of ciphertexts. Similarly, a compacted re-encrypted ciphertext is formed from the product of all smaller ciphertexts in the sequence of re-encrypted ciphertexts. To retain the biconditional logical connective between the fact that the compacted re-encrypted ciphertext is really a re-encryption of the compacted ciphertext if and only if each of the smaller re-encrypted ciphertexts is really a re-encryption of the corresponding smaller ciphertexts, the factors of the products are tagged with hash exponents, i.e. each of the factors of the product is exponentiated with a value from a digest of a cryptographic hash function. The cryptographic hash function preferably is a random oracle function that takes all of the smaller ciphertexts and all of the re-encrypted smaller ciphertexts as argument. Furthermore, nonce values of arbitrarily chosen bit strings may included in the argument of the cryptographic hash function. Those nonce values serve as salts individualizing the hash exponents and protecting the digests against replay attacks.

The plaintext compaction technique of FIG. 1 may particularly be used for ElGamal encrpytion schemes as asymmetric encryption scheme. Each of the smaller ciphertexts may in such case—without limitation of generality—include unambiguously paired ElGamal ciphertext tuples. In that regard, each of the tuple components may be compacted separately so that the compacted ciphertexts each include ElGamal ciphertext tuples as well.

Due to the selection of the hash exponents as digests of a cryptographic has function, the compacted ciphertexts serve a fingerprints for the sequence of smaller ciphertexts, both in the original as well as in the re-encryption case. The homomorphic nature of the ElGamal encryption scheme ensures that the compacted ciphertexts are each valid ElGamal ciphertexts as well. Therefore, the compaction technique of FIG. 1 may be advantageously used in plaintext equivalence proofs (PEPs), disjunctive plaintext equivalence proofs (DPEPs) and consequently proofs of shuffle (POS). Examples of such proofs are given in the following FIGS. 2 and 3.

A malicious prover is not able to cheat by modifying any of the re-encrypted smaller ciphertexts to different ciphertexts because each of the true re-encryptions are combined with a hash exponent in the compacted re-encrypted ciphertext. Thus, any malicious prover would need to know the hash exponents in advance. However, the hash exponents depend on each of the re-encrypted smaller ciphertexts so that each change to a re-encrypted smaller ciphertext would inevitably lead to a change in the digest of the cryptographic hash function. Being a true one-way function that chooses its digest uniformly at random, the cryptographic hash function renders it perfectly impossible for the prover to predict the digest of the cryptographic hash function on any given pre-determined, but not yet processed input argument.

FIG. 2 schematically illustrates a technique for performing a zero-knowledge proof of plaintext equivalence using the compaction technique of FIG. 1 in pseudocode style.

First, a prover performs a standard zero-knowledge proof technique, exemplary a Chaum-Pedersen proof that proves tuples to be tuples where the DDH assumption holds without disclosing the re-encryption exponents. To that end, an ephemeral key s is generated within the ElGamal group G as commitment of the prover. The Fiat-Shamir heuristic is used to render the zero-knowledge proof non-interactive by relying on the cryptographic hash function H(*) to generate a challenge aux. The secret to be proven is convoluted with the hash exponents $a_i$ as generated with the same cryptographic hash function H(*) that is used to generate the challenge aux. The verification process on the verifier side relies on the compaction technique in FIG. 1 to determine reliably whether or not the prover is in possession of the plaintexts in zero-knowledge.

FIG. 3 schematically illustrates a technique for performing a disjunctive proof of plaintext equivalence using the compaction technique of FIG. 1 in pseudocode style.

This technique is an extended technique for performing a zero-knowledge proof of plaintext equivalence of FIG. 2 where the prover shows that a long ciphertext $c_i$ is a re-encryption of either one of the long ciphertexts $c_i'$. The prover is allowed to cheat in all but one PEP protocols and the PEP protocol is iterated for each of the long ciphertexts $c_i'$ separately. The salt values aux as challenges are again chosen by the cryptographic hash function H(*). As only the XOR concatenated of all individual salt values $aux_i$ needs to match the challenge aux, the prover is free to cheat in the remaining $aux_i$. The re-encryption property of the compaction technique of FIG. 1 still holds for any of the re-encryptions, so that an iteration of the PEP protocol will finally yield a reliable determination that the prover is in possession of all input ciphertexts.

Figure 5:
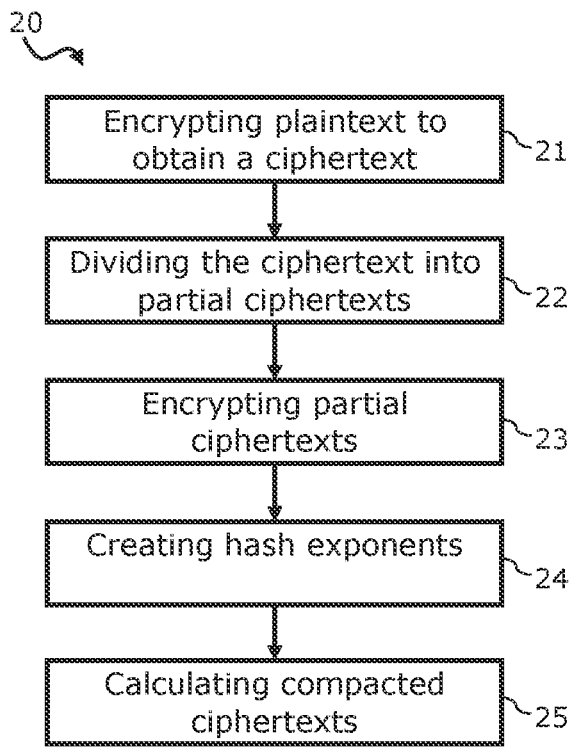
FIG. 5 shows a flowchart of procedural stages of a method for compacting ciphertexts according to a further embodiment of the disclosure herein.
Figure 6:
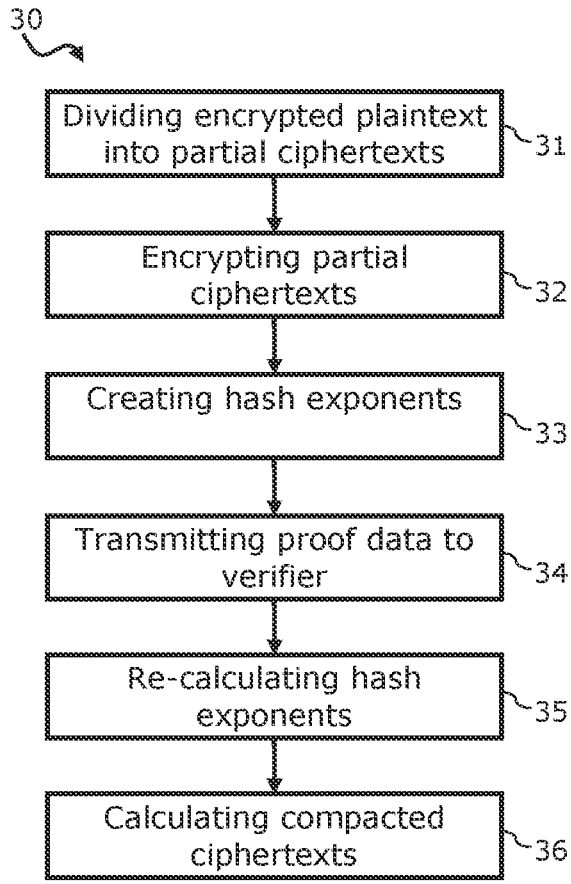
FIG. 6 shows a flowchart of procedural stages of a method for performing a zero-knowledge proof of plaintext equivalence according to a further embodiment of the disclosure herein.
Figure 7:
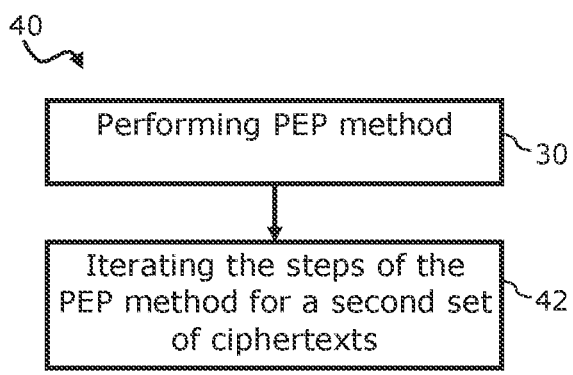
FIG. 7 shows a flowchart of procedural stages of a method for performing a disjunctive proof of plaintext equivalence according to a further embodiment of the disclosure herein.
Figure 8:
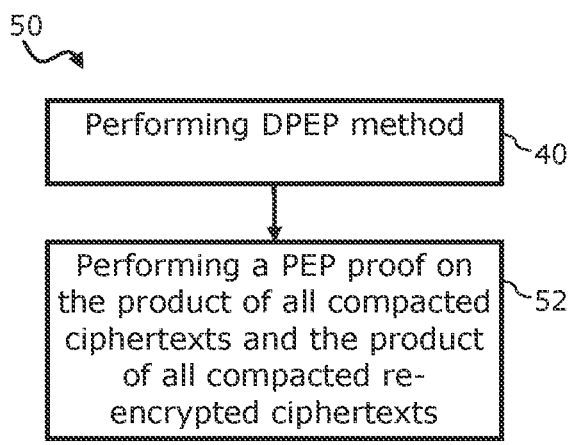
FIG. 8 shows a flowchart of procedural stages of a method for verifying a shuffle of re-encryptions of a plurality of ciphertexts in zero-knowledge according to a further embodiment of the disclosure herein.

FIG. 5 schematically illustrates procedural stages of a method 20 for compacting ciphertexts. FIG. 6 schematically illustrates procedural stages of a method 30 for performing a zero-knowledge proof of plaintext equivalence. FIG. 7 schematically illustrates procedural stages of a method 40 for performing a disjunctive proof of plaintext equivalence. FIG. 8 schematically illustrates procedural stages of a method 50 for verifying a shuffle of re-encryptions of a plurality of ciphertexts in zero-knowledge. The methods 20, 30, 40 and 50 may in particular be used in mixnets such as the mixnet 10 depicted in and explained in conjunction with FIG. 4. The methods 20, 30, 40 and 50 may advantageously be used for communication systems that employ mixnets for shuffling long ElGamal re-encrypted ciphertexts, i.e. ciphertexts having underlying plaintexts of a text length far longer than the maximum encryption length of the ElGamal encryption system under given security parameters. For example, long in the context of such re-encrypted ciphertexts may be on the order of megabyte, while the maximum ElGamal encryption length may be for example 2048 bit.

The method 20 in FIG. 5 for compacting ciphertexts involves in a first stage 21 encrypting a plaintext using an asymmetric key encryption scheme to obtain a ciphertext. The ciphertext is then divided into a plurality of partial ciphertexts in stage 22. Each of the plurality of partial ciphertexts is encrypted in stage 23 using the asymmetric key encryption scheme to obtain a plurality of re-encrypted partial ciphertexts, for example an ElGamal or Paillier encryption scheme. Stage 24 of the method 24 involves creating a plurality of hash exponents from a digest of a cryptographic hash function. The argument of the cryptographic hash function is dependent on each of the plurality of partial ciphertexts, each of the plurality of re-encrypted partial ciphertexts and one ore more arbitrary salt values, the salt values being chosen as nonce values, for example auxiliary chosen one-time use bit strings. The method 20 involves in stage 25 the calculation of both a compacted ciphertext and a compacted re-encrypted ciphertext. The compacted ciphertexts are calculated by multiplying all of the plurality of partial ciphertexts, or of re-encrypted partial ciphertexts, respectively, exponentiated by a respective one of the plurality of hash exponents. The method 20 of FIG. 5 advantageously reduces the amount of ciphertexts for which re-encryptions have to be proven down to one since a comparison of the compacted ciphertext with the compacted re-encrypted ciphertext allows for a biconditionally valid verification that each of the partial ciphertexts of which the compacted ciphertext is formed is in fact a true re-encryption of the corresponding one of the plurality of re-encrypted partial ciphertexts.

The method 30 of FIG. 6 for performing a zero-knowledge proof of plaintext equivalence involves several stages 31 to 34 on a prover side. First, a ciphertext is divided into a plurality of partial ciphertexts. The ciphertext is an encrypted plaintext using an asymmetric key encryption scheme like an ElGamal or Paillier encryption scheme. The, each of the plurality of partial ciphertexts is encrypted using the asymmetric key encryption scheme with a plurality of re-encryption keys. Thus, a plurality of re-encrypted partial ciphertexts is obtained. The prover further creates a plurality of hash exponents from a digest of a cryptographic hash function. The argument of the cryptographic hash function is dependent on each of the plurality of partial ciphertexts, each of the plurality of re-encrypted partial ciphertexts and one ore more arbitrary salt values, the salt values being chosen as nonce values, for example auxiliary chosen one-time use bit strings. The salt values basically serve as commitment chosen by the prover.

Then, the prover transmits the plurality of re-encrypted partial ciphertexts and the sum of the commitment and the product of the plurality of salt values, the plurality of hash exponents and the plurality of re-encryption keys to a verifier. On the verifier side, the method 30 of FIG. 6 involves in stage 35 the re-calculation of the plurality of hash exponents from the digest of the cryptographic hash function. The verifier is able to so since the cryptographic hash function is open source to both the prover and the verifier and will yield—as random oracle function—the same digest for the prover and verifier reliably, given the same input arguments. In stage 36, the verifier then calculates a compacted ciphertext and a compacted re-encryption ciphertext by multiplying all of the plurality of partial ciphertexts, or of re-encrypted partial ciphertexts, respectively, exponentiated by a respective one of the plurality of re-calculated hash exponents. This enables the verifier to verify that the compacted re-encrypted ciphertext is a re-encryption of the compacted ciphertext. In turn, this verification ensures that each of the plurality of re-encrypted partial ciphertexts is truly an encryption of the plurality of partial ciphertexts. The verifier, using the verification process as set out above, will therefore know reliably and uncheatably whether or not the prover correctly re-encrypted the partial ciphertexts.

The method 40 of FIG. 7 for performing a disjunctive proof of plaintext equivalence involves on a prover side as well as on a verifier side, the same stages as the method 30 for a single ciphertext out of the plurality of re-encrypted ciphertexts. This allows the prover to possibly cheat in all but one ciphertext. When the method 30 is performed iteratively in stage 42 for each ciphertext of the plurality of input ciphertexts, the verifier is ultimately able to disjunctively verify that each of the plurality of re-encrypted ciphertexts is a true re-encryption of one of the plurality of input ciphertexts, without being able to tell from the verification process alone which of the plurality of input ciphertexts corresponds to which of the plurality of re-encrypted ciphertexts since the prover may deliberately cheat in each iteration on up to all but one ciphertexts.

The method 50 of FIG. 8 for verifying a shuffle of re-encryptions of a plurality of ciphertexts in zero-knowledge involves performing the DPEP method 40 of FIG. 7. Assuming that a number of long input ciphertexts are each chopped down into a sequence of smaller partial input ciphertexts, the shuffle of re-encryptions may be iteratively proven to be true re-encryptions on a one-by-one basis without allowing to the verifier to gain knowledge about the choice of permutations. In order to additionally prove that the shuffle really is a permutation of all input ciphertexts, stage 52 involves performing a proof of plaintext equivalence on all of the products of the compacted ciphertexts and the products of the compacted re-encrypted ciphertexts obtained during the iterative process of performing DPEPs in stage 40. If the proof of plaintext equivalence on those products is successful, the verifier may reliably and uncheatably determine that the ciphertexts in both sequences of ciphertexts remains the same.

In the foregoing specification, the disclosure herein has been described with reference to specific examples of embodiments of the disclosure herein. It will, however, be evident that various modifications and changes may be made therein without departing from the broader spirit and scope of the disclosure herein as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatuses implementing the disclosure herein are, for the most part, composed of electronic components and circuits known to those skilled in the art, details of the circuitry and its components will not be explained in any greater extent than that considered necessary as illustrated above, for the understanding and appreciation of the underlying concepts of the disclosure herein and in order not to obfuscate or distract from the teachings of the disclosure herein.

Also, the disclosure herein is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that the illustrations of chosen elements in the drawings are only used to help to improve the understanding of the functionality and the arrangements of these elements in various embodiments of the disclosure herein. Also, common and well understood elements that are useful or necessary in a commercially feasible embodiment are generally not depicted in the drawings in order to facilitate the understanding of the technical concept of these various embodiments of the disclosure herein. It will further be appreciated that certain procedural stages in the described methods may be described or depicted in a particular order of occurrence while those skilled in the art will understand that such specificity with respect to sequence is not actually required.

The invention claimed is:

1. A method for compacting ciphertexts, the method comprising:
    encrypting a plaintext using an asymmetric key encryption scheme to obtain a ciphertext;
    dividing the ciphertext into a plurality of partial ciphertexts;
    encrypting each of the plurality of partial ciphertexts using the asymmetric key encryption scheme to obtain a plurality of re-encrypted partial ciphertexts;
    creating a plurality of hash exponents from a digest of a cryptographic hash function taking the plurality of partial ciphertexts, the plurality of re-encrypted partial ciphertexts and a plurality of arbitrary salt values as argument of the cryptographic hash function, wherein the plurality of arbitrary salt values comprise auxiliary chosen one-time use bit strings;
    calculating a compacted ciphertext by multiplying all of the plurality of partial ciphertexts exponentiated by a respective one of the plurality of hash exponents; and
    calculating a compacted re-encrypted ciphertext by multiplying all of the plurality of re-encrypted partial ciphertexts exponentiated by a respective one of the plurality of hash exponents.

2. The method of claim 1, wherein the cryptographic hash function is a one-way function.

3. The method of claim 1, wherein output values of the cryptographic hash function are chosen uniformly at random.

4. The method of claim 1, wherein the asymmetric key encryption scheme is an ElGamal encryption system.

5. The method of claim 4, wherein each of the plurality of partial ciphertexts include unambiguously paired ElGamal ciphertext tuples.

6. A method for performing a zero-knowledge proof of plaintext equivalence, the method comprising:
    by a prover:
        dividing a ciphertext into a plurality of partial ciphertexts, the ciphertext being an encrypted plaintext using an asymmetric key encryption scheme;
        encrypting each of the plurality of partial ciphertexts using the asymmetric key encryption scheme with a plurality of re-encryption keys to obtain a plurality of re-encrypted partial ciphertexts;
        creating a plurality of hash exponents from a digest of a cryptographic hash function taking the plurality of partial ciphertexts, the plurality of re-encrypted partial ciphertexts and a plurality of salt values as argument of the cryptographic hash function, the plurality of salt values being based on a commitment chosen by the prover and wherein the plurality of arbitrary salt values comprise auxiliary chosen one-time use bit strings;
        transmitting the plurality of re-encrypted partial ciphertexts to a verifier; and transmitting a sum of the commitment and a product of the plurality of salt values, the plurality of hash exponents and the plurality of re-encryption keys to the verifier; and by the verifier:

re-calculating the plurality of hash exponents from the digest of the cryptographic hash function taking the plurality of partial ciphertexts, the plurality of re-encrypted partial ciphertexts and the plurality of salt values as argument of the cryptographic hash function;

calculating a compacted ciphertext by multiplying all of the plurality of partial ciphertexts exponentiated by a respective one of the plurality of re-calculated hash exponents;

calculating a compacted re-encrypted ciphertext by multiplying all of the plurality of re-encrypted partial ciphertexts exponentiated by a respective one of the plurality of re-calculated hash exponents; and verifying that the compacted re-encrypted ciphertext is a re-encryption of the compacted ciphertext, thereby verifying that each of the plurality of re-encrypted partial ciphertexts is an encryption of the plurality of partial ciphertexts.

7. The method of claim 6, wherein the cryptographic hash function is a one-way function.

8. The method of claim 6, wherein output values of the cryptographic hash function are chosen uniformly at random.

9. The method of claim 6, wherein the asymmetric key encryption scheme is an ElGamal encryption system.

10. The method of claim 9, wherein each of the plurality of partial ciphertexts include unambiguously paired ElGamal ciphertext tuples.

11. A method for performing a disjunctive proof of plaintext equivalence, the method comprising in a first stage of a proof of plaintext equivalence:

by a prover:

dividing a ciphertext into a plurality of partial ciphertexts, the ciphertext being an encrypted plaintext using an asymmetric key encryption scheme;

encrypting each of the plurality of partial ciphertexts using the asymmetric key encryption scheme with a first plurality of re-encryption keys to obtain a plurality of re-encrypted partial ciphertexts;

creating a first plurality of hash exponents from a digest of a cryptographic hash function taking a selected first one of the plurality of partial ciphertexts, the plurality of re-encrypted partial ciphertexts and a first plurality of salt values as argument of the cryptographic hash function, the first plurality of salt values being based on a first commitment chosen by the prover;

transmitting the plurality of re-encrypted partial ciphertexts to a verifier; and transmitting a sum of the first commitment and a product of the first plurality of salt values, the first plurality of hash exponents and the first plurality of re-encryption keys to the verifier; and by the verifier:

re-calculating the first plurality of hash exponents from the digest of the cryptographic hash function taking the plurality of partial ciphertexts, the plurality of re-encrypted partial ciphertexts and the first plurality of salt values as argument of the cryptographic hash function;

calculating a compacted ciphertext by multiplying all of the plurality of partial ciphertexts exponentiated by a respective one of the first plurality of re-calculated hash exponents;

calculating a compacted re-encrypted ciphertext by multiplying all of the plurality of re-encrypted partial ciphertexts exponentiated by a respective one of the first plurality of re-calculated hash exponents;

verifying that the compacted re-encrypted ciphertext is a re-encryption of the compacted ciphertext, thereby verifying that at least one of the plurality of re-encrypted partial ciphertexts is an encryption of an arbitrary one of the plurality of partial ciphertexts; and iterating steps of the prover and the verifier for a selected second one of the plurality of partial ciphertexts using a second plurality of re-encryption keys, a second plurality of salt values being based on a second commitment chosen by the prover and a second plurality of hash exponents as input parameters for the second stage of the proof of plaintext equivalence;

wherein the first plurality of arbitrary salt values and the second plurality of arbitrary salt values comprise auxiliary chosen one-time use bit strings.

12. The method of claim 11, wherein the cryptographic hash function is a one-way function.

13. The method of claim 11, wherein output values of the cryptographic hash function are chosen uniformly at random.

14. The method of claim 11, wherein the asymmetric key encryption scheme is an ElGamal encryption system.

15. The method of claim 14, wherein each of the plurality of partial ciphertexts include unambiguously paired ElGamal ciphertext tuples.

16. A method for verifying a shuffle of re-encryptions of a plurality of ciphertexts in zero-knowledge, the method comprising in a first stage of a proof of plaintext equivalence:

by a prover:

dividing a first one of the plurality of ciphertexts into a plurality of partial ciphertexts, the ciphertext being an encrypted plaintext using an asymmetric key encryption scheme;

encrypting each of the plurality of partial ciphertexts using the asymmetric key encryption scheme with a first plurality of re-encryption keys to obtain a plurality of re-encrypted partial ciphertexts;

creating a first plurality of hash exponents from a digest of a cryptographic hash function taking a selected first one of the plurality of partial ciphertexts, the plurality of re-encrypted partial ciphertexts and a first plurality of salt values as argument of the cryptographic hash function, the first plurality of salt values being based on a first commitment chosen by the prover;

transmitting the plurality of re-encrypted partial ciphertexts to a verifier; and transmitting a sum of the first commitment and a product of the first plurality of salt values, the first plurality of hash exponents and the first plurality of re-encryption keys to the verifier;

the method further comprising in a second stage of a proof of plaintext equivalence by the verifier:

re-calculating the first plurality of hash exponents from the digest of the cryptographic hash function taking the plurality of partial ciphertexts, the plurality of re-encrypted partial ciphertexts and the first plurality of salt values as argument of the cryptographic hash function;
calculating a compacted ciphertext by multiplying all of the plurality of partial ciphertexts exponentiated by a respective one of the first plurality of re-calculated hash exponents;
calculating a compacted re-encrypted ciphertext by multiplying all of the plurality of re-encrypted partial ciphertexts exponentiated by a respective one of the first plurality of re-calculated hash exponents;
verifying that the compacted re-encrypted ciphertext is a re-encryption of the compacted ciphertext, thereby verifying that at least one of the plurality of re-encrypted partial ciphertexts is an encryption of an arbitrary one of the plurality of partial ciphertexts; and
iterating steps of the prover and the verifier for a selected second one of the plurality of partial ciphertexts using a second plurality of re-encryption keys, a second plurality of salt values being based on a second commitment chosen by the prover and a second plurality of hash exponents as input parameters for the second stage of the proof of plaintext equivalence, and
the method comprising in a third stage of a proof of plaintext equivalence:
by the prover:
dividing a second one of the plurality of ciphertexts into a plurality of partial ciphertexts, the ciphertext being an encrypted plaintext using an asymmetric key encryption scheme;
encrypting each of the plurality of partial ciphertexts using the asymmetric key encryption scheme with a first plurality of re-encryption keys to obtain a plurality of re-encrypted partial ciphertexts;
creating a first plurality of hash exponents from a digest of a cryptographic hash function taking a selected first one of the plurality of partial ciphertexts, the plurality of re-encrypted partial ciphertexts and a first plurality of salt values as argument of the cryptographic hash function, the first plurality of salt values being based on a first commitment chosen by the prover;
transmitting the plurality of re-encrypted partial ciphertexts to the verifier; and
transmitting a sum of the first commitment and a product of the first plurality of salt values, the first plurality of hash exponents and the first plurality of re-encryption keys to the verifier;
the method further comprising a fourth stage of a proof of plaintext equivalence by the verifier:
re-calculating the first plurality of hash exponents from the digest of the cryptographic hash function taking the plurality of partial ciphertexts, the plurality of re-encrypted partial ciphertexts and the first plurality of salt values as argument of the cryptographic hash function;
calculating a compacted ciphertext by multiplying all of the plurality of partial ciphertexts exponentiated by a respective one of the first plurality of re-calculated hash exponents;
calculating a compacted re-encrypted ciphertext by multiplying all of the plurality of re-encrypted partial ciphertexts exponentiated by a respective one of the first plurality of re-calculated hash exponents;
verifying that the compacted re-encrypted ciphertext is a re-encryption of the compacted ciphertext, thereby verifying that at least one of the plurality of re-encrypted partial ciphertexts is an encryption of an arbitrary one of the plurality of partial ciphertexts; and
iterating steps of the prover and the verifier for a selected second one of the plurality of partial ciphertexts using a second plurality of re-encryption keys, a second plurality of salt values being based on a second commitment chosen by the prover and a second plurality of hash exponents as input parameters for the fourth stage of the proof of plaintext equivalence,
the method further comprising performing a proof of plaintext equivalence on a product of the compacted ciphertexts of the first to fourth stages and a product of the compacted re-encrypted ciphertexts of the first to fourth stages;
wherein the first plurality of arbitrary salt values and the second plurality of arbitrary salt values comprise auxiliary chosen one-time use bit strings.

17. A mixnet, comprising:
a plurality of mixes, each mix configured to re-encrypt a plurality of ciphertexts input to the mix and to shuffle the re-encryptions of the input plurality of ciphertexts; and
a verification device coupled to each of the mixes,
wherein each of the mixes as prover and the verification device as verifier are together configured to perform a method for performing a zero-knowledge proof of plaintext equivalence, the method comprising:
by the mix:
dividing a ciphertext into a plurality of partial ciphertexts, the ciphertext being an encrypted plaintext using an asymmetric key encryption scheme;
encrypting each of the plurality of partial ciphertexts using the asymmetric key encryption scheme with a plurality of re-encryption keys to obtain a plurality of re-encrypted partial ciphertexts;
creating a plurality of hash exponents from a digest of a cryptographic hash function taking the plurality of partial ciphertexts, the plurality of re-encrypted partial ciphertexts and a plurality of salt values as argument of the cryptographic hash function, the plurality of salt values being based on a commitment chosen by the prover;
transmitting the plurality of re-encrypted partial ciphertexts to a verifier; and
transmitting the sum of the commitment and the product of the plurality of salt values, the plurality of hash exponents and the plurality of re-encryption keys to the verifier;
by the verification device:
re-calculating the plurality of hash exponents from the digest of the cryptographic hash function taking the plurality of partial ciphertexts, the plurality of re-encrypted partial ciphertexts and the plurality of salt values as argument of the cryptographic hash function;
calculating a compacted ciphertext by multiplying all of the plurality of partial ciphertexts exponentiated by a respective one of the plurality of re-calculated hash exponents;
calculating a compacted re-encrypted ciphertext by multiplying all of the plurality of re-encrypted partial ciphertexts exponentiated by a respective one of the plurality of re-calculated hash exponents; and verifying that the compacted re-encrypted ciphertext is a re-encryption of the compacted ciphertext, thereby verifying that each of the plurality of re-encrypted partial ciphertexts is an encryption of the plurality of partial ciphertexts;

wherein the plurality of arbitrary salt values comprise auxiliary chosen one-time use bit strings.

18. A mixnet, comprising:

a plurality of mixes, each mix configured to re-encrypt a plurality of ciphertexts input to the mix and to shuffle the re-encryptions of the input plurality of ciphertexts; and a verification device coupled to each of the mixes, wherein each of the mixes as prover and the verification device as verifier are together configured to perform a method for performing a disjunctive proof of plaintext equivalence, the method comprising in a first stage of a proof of plaintext equivalence:

by the mix:
- dividing a ciphertext into a plurality of partial ciphertexts, the ciphertext being an encrypted plaintext using an asymmetric key encryption scheme;
- encrypting each of the plurality of partial ciphertexts using the asymmetric key encryption scheme with a first plurality of re-encryption keys to obtain a plurality of re-encrypted partial ciphertexts;
- creating a first plurality of hash exponents from a digest of a cryptographic hash function taking a selected first one of the plurality of partial ciphertexts, the plurality of re-encrypted partial ciphertexts and a first plurality of salt values as argument of the cryptographic hash function, the first plurality of salt values being based on a first commitment chosen by the prover;
- transmitting the plurality of re-encrypted partial ciphertexts to a verifier; and
- transmitting a sum of the first commitment and a product of the first plurality of salt values, the first plurality of hash exponents and the first plurality of re-encryption keys to the verifier;

by the verification device:
- re-calculating the first plurality of hash exponents from the digest of the cryptographic hash function taking the plurality of partial ciphertexts, the plurality of re-encrypted partial ciphertexts and the first plurality of salt values as argument of the cryptographic hash function;
- calculating a compacted ciphertext by multiplying all of the plurality of partial ciphertexts exponentiated by a respective one of the first plurality of re-calculated hash exponents;
- calculating a compacted re-encrypted ciphertext by multiplying all of the plurality of re-encrypted partial ciphertexts exponentiated by a respective one of the first plurality of re-calculated hash exponents;
- verifying that the compacted re-encrypted ciphertext is a re-encryption of the compacted ciphertext, thereby verifying that at least one of the plurality of re-encrypted partial ciphertexts is an encryption of an arbitrary one of the plurality of partial ciphertexts; and
- iterating steps of the prover and the verifier for a selected second one of the plurality of partial ciphertexts using a second plurality of re-encryption keys, a second plurality of salt values being based on a second commitment chosen by the prover and a second plurality of hash exponents as input parameters for the second stage of the proof of plaintext equivalence;

wherein the plurality of arbitrary salt values comprise auxiliary chosen one-time use bit strings.

* * * * *